(12) United States Patent
Scott

(10) Patent No.: US 8,643,201 B2
(45) Date of Patent: Feb. 4, 2014

(54) GENERATOR SYSTEM FOR RECOVERING VEHICLE AND RESIDENT WASTED ENERGY

(76) Inventor: Obie Scott, Seattle, WA (US)

( * ) Notice: Subject to any disclaimer, the term of this patent is extended or adjusted under 35 U.S.C. 154(b) by 384 days.

(21) Appl. No.: 13/037,248

(22) Filed: Feb. 28, 2011

(65) Prior Publication Data

US 2011/0210562 A1     Sep. 1, 2011

Related U.S. Application Data

(60) Provisional application No. 61/309,147, filed on Mar. 1, 2010.

(51) Int. Cl.
*F02B 63/04*         (2006.01)

(52) U.S. Cl.
USPC ......................................................... 290/1 R

(58) Field of Classification Search
USPC .............. 290/1 R, 40 C; 180/165, 166, 65.31
See application file for complete search history.

(56) References Cited

U.S. PATENT DOCUMENTS

| | | | | |
|---|---|---|---|---|
| 4,010,378 A * | 3/1977 | Tharpe et al. | ...................... | 290/2 |
| 4,061,200 A * | 12/1977 | Thompson | .................... | 180/165 |
| 4,309,620 A * | 1/1982 | Bock | ............................. | 290/4 R |
| 4,602,694 A * | 7/1986 | Weldin | ........................... | 180/2.2 |
| 4,653,601 A * | 3/1987 | Nakamura et al. | ............ | 180/446 |
| 5,120,282 A * | 6/1992 | Fjallstrom | ........................ | 475/5 |
| 5,704,440 A * | 1/1998 | Urban et al. | ............... | 180/65.23 |
| 6,326,702 B1 * | 12/2001 | Yonekura et al. | ........... | 290/40 C |
| 7,109,596 B2 * | 9/2006 | Shimizu | ...................... | 290/40 C |
| 7,279,799 B1 * | 10/2007 | McCauley | .................... | 290/1 R |
| 8,089,168 B2 * | 1/2012 | Chevrette | ..................... | 290/1 R |
| 2002/0116113 A1* | 8/2002 | Kaneko | ......................... | 701/112 |
| 2007/0013244 A1* | 1/2007 | Kinkaid | ...................... | 310/75 C |
| 2007/0095587 A1* | 5/2007 | DuCharme | .................. | 180/65.3 |
| 2009/0026772 A1* | 1/2009 | Huang et al. | ................ | 290/40 C |
| 2011/0001322 A1* | 1/2011 | Armani et al. | ................ | 290/1 R |

* cited by examiner

*Primary Examiner* — Julio Gonzalez
(74) *Attorney, Agent, or Firm* — Joseph Z. Ellsworth

(57) ABSTRACT

The system is intended to extract energy from a vehicle that is otherwise wasted. As an example and not limiting, the generator and linkage as described can be employed with the rotation of a vehicle wheel to capture energy lost during vehicle braking with the generator functioning to convert vehicle momentum to electric power by putting a load on the wheels of the vehicle which effectively brakes the vehicle while driving the generator, which electricity from the generator likewise is stored in batteries.

2 Claims, 4 Drawing Sheets

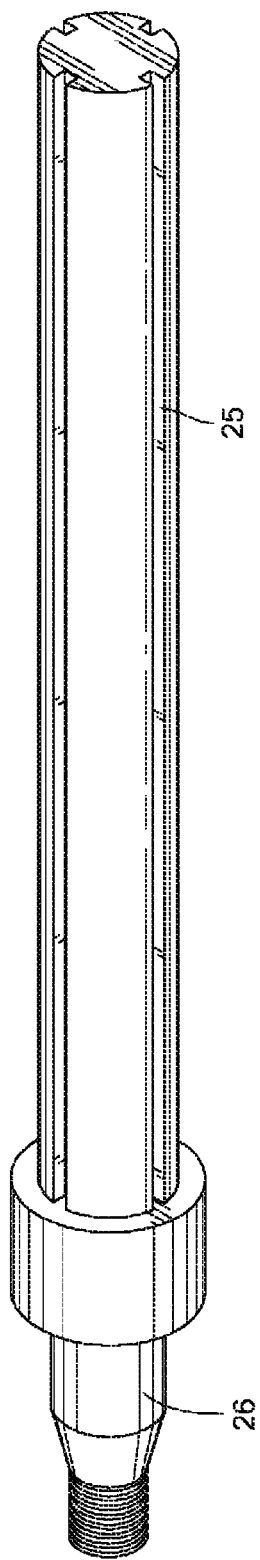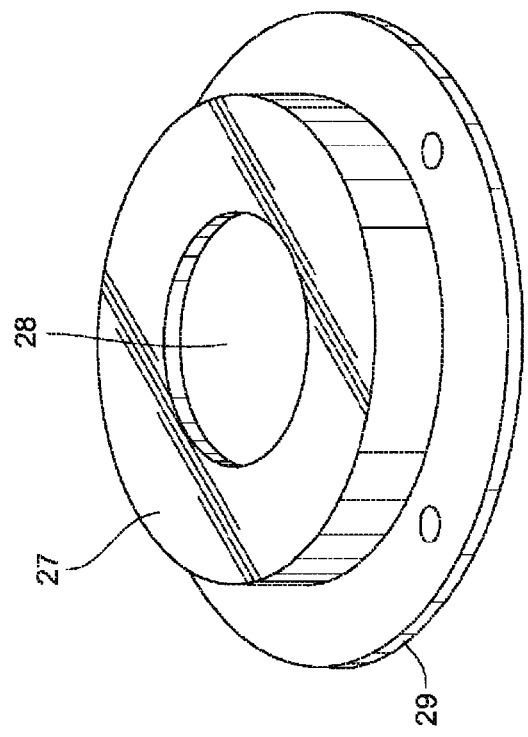

GENERATOR SYSTEM FOR RECOVERING VEHICLE AND RESIDENT WASTED ENERGY

Kindly, use the priority established by Provisional application 61/309,147 which was filed on Mar. 1, 2010.

FIELD OF THE INVENTION

This invention relates to a device that can be retrofit onto any vehicle for harvesting wasted energy from the rotation of the tires and converting that energy into electricity. The electrical energy can then be stored in batteries or capacitors and used by the car.

BACKGROUND OF THE INVENTION

Currently there are hybrid vehicles that utilize regenerative braking to convert wasted energy from braking into electrical energy by means of a generator. Also, highway cruising can be made more efficient by pulling excess power from the motor or wheels and converting it to electric energy. Hybrid vehicles are very expensive and may never save as much money in gas as they cost to procure. Also, many people already have a vehicle and they can't afford to upgrade to a hybrid vehicle whenever gas prices get overly expensive.

SUMMARY OF THE INVENTION

Some consumers already have a car and would simply like to increase its fuel efficiency. This invention will allow individuals to retrofit an existing car with a generator that uses wasted energy from normal vehicle operation and convert it to electrical energy. This invention will employ regenerative braking and also pull excess horsepower from the engine while cruising at highway speeds. This invention can be retrofit to a vehicle without changing the outside appearance of the vehicle body.

The present invention requires installation of a generator near the wheels of the car. An aperture will need to be cut through the wheel well of the existing car large enough to pass the generator pulley through. The wheels will be retrofit with a large pulley on the inside of the tire or rim. This pulley on the wheel will then be connected to the pulley on the generator by utilizing a belt of pliable material. The generator will have a gear that engages when the car is braking The gear can also change gear ratio when more power is needed or when less drag on the tires is desired.

BRIEF DESCRIPTION OF THE DRAWINGS

FIG. 5: Isometric view of the splined generator shaft.

FIG. 6: Isometric view of the generator shaft gear plate.

DETAILED DESCRIPTION OF THE PREFERRED EMBODIEMENTS

Figure 1:
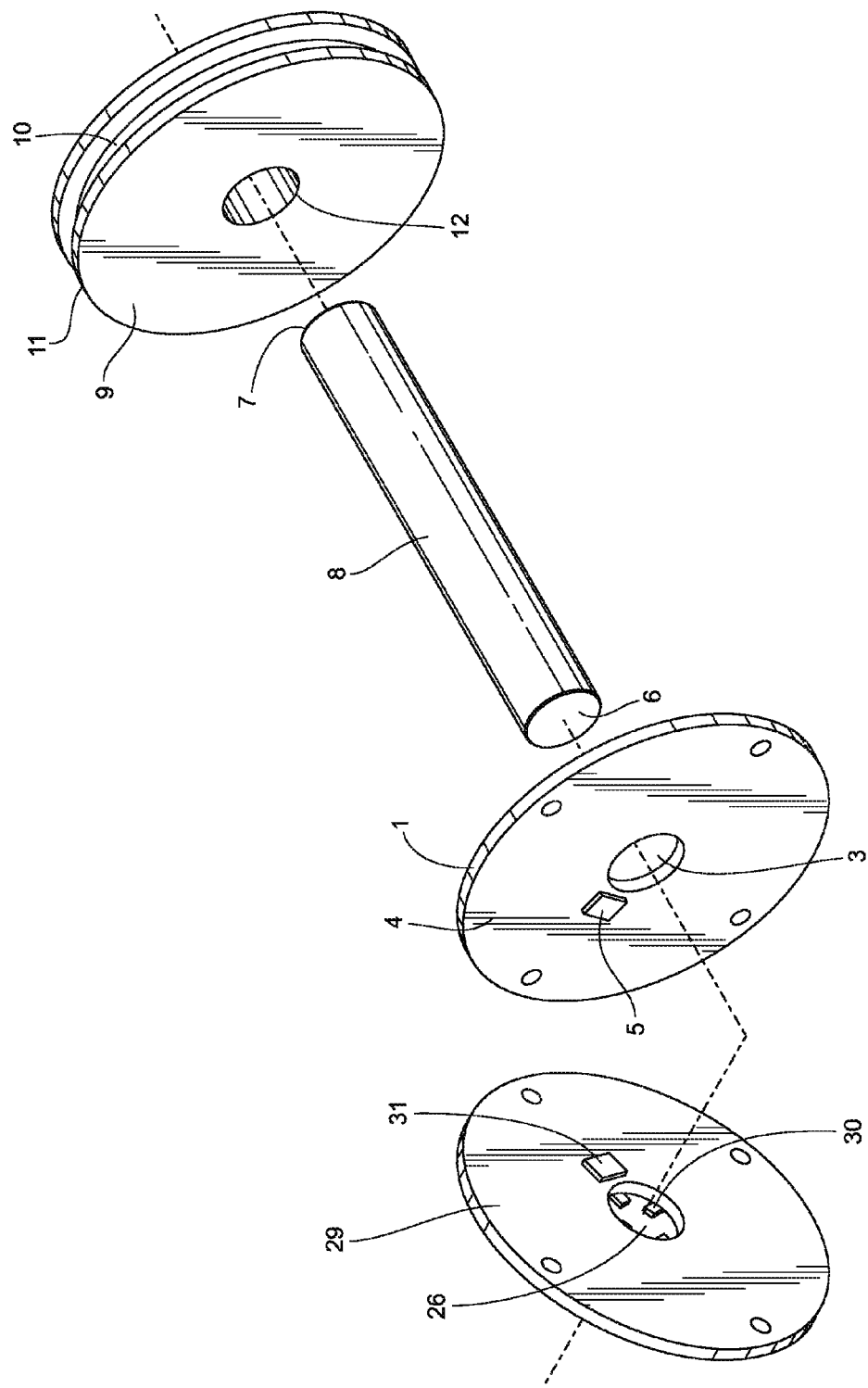
FIG. 1: Isometric view of the crank shaft plate, the generator shaft sleeve, and the generator pulley and how they align to the generator shaft gear plate.
Figure 2:
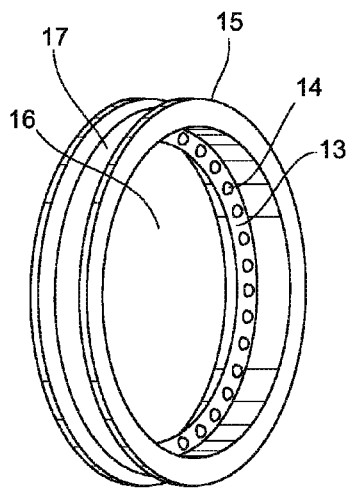
FIG. 2: Isometric view of the vehicle wheel pulley.
Figure 3:
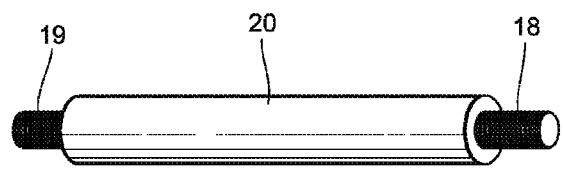
FIG. 3: Isometric view of the wheel anchor rod.
Figure 4:
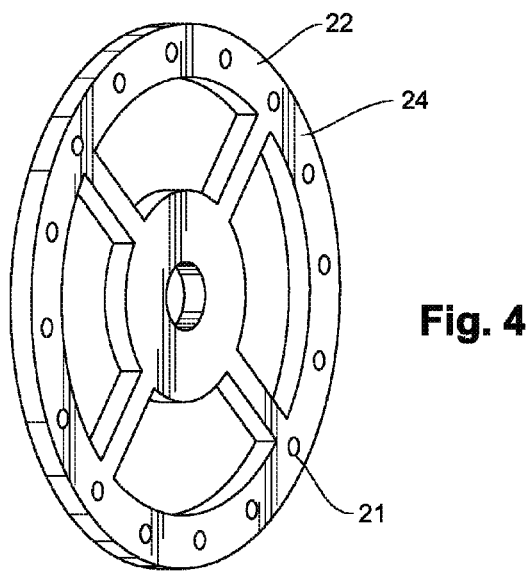
FIG. 4: Isometric view of the wheel axel plate.
Figure 7:
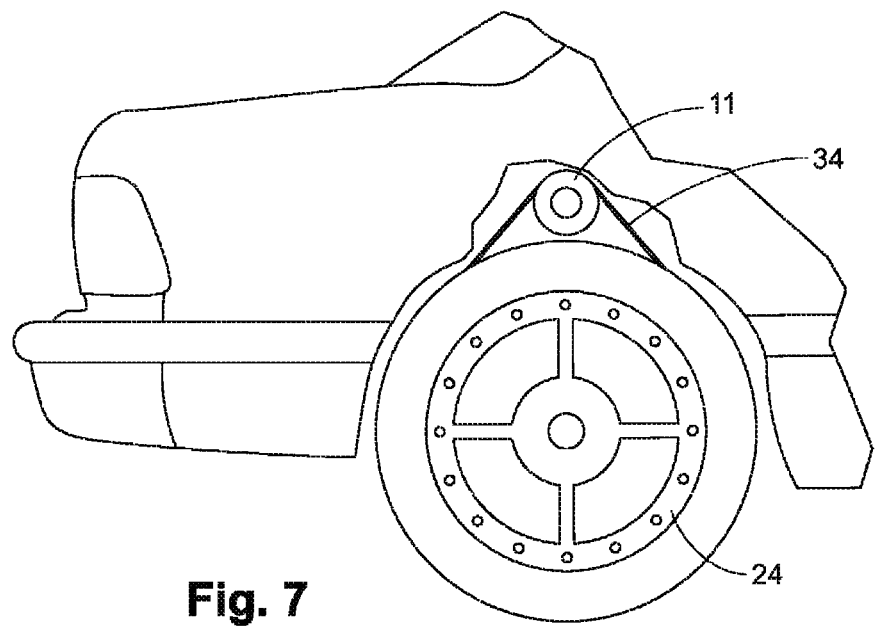
FIG. 7: Side view of a portion of a vehicle showing the wheel with pulley system attached.
Figure 8:
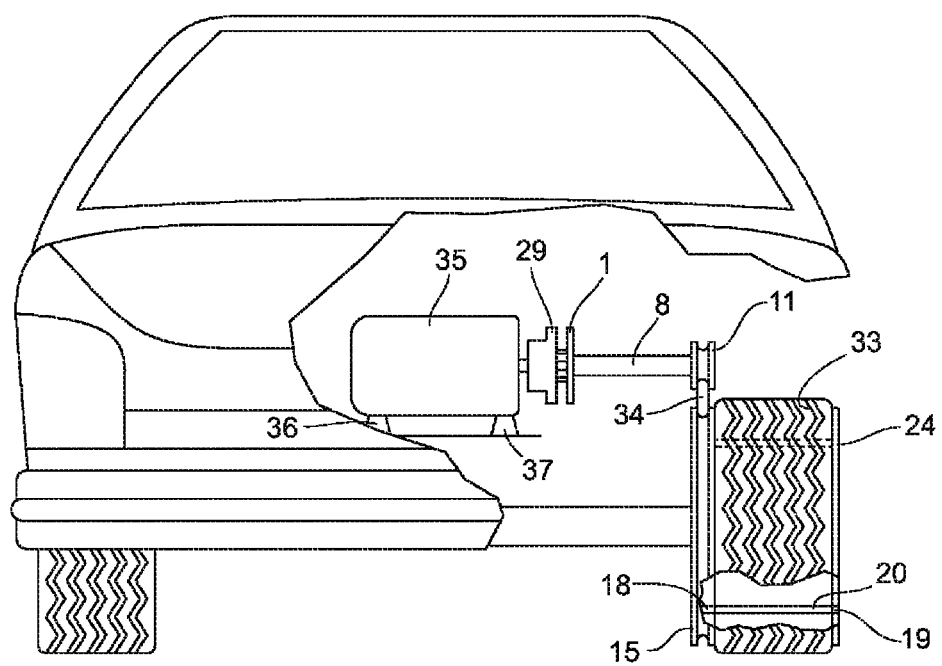
FIG. 8: Aft view of a vehicle with a cutaway showing the full configuration of the invention.

The preferred embodiment of the invention comprises a commonly known vehicle with at least one vehicle wheel 33. On the outboard side of the vehicle wheel 33 is a wheel axle plate 24 held in place and resisting movement about its axis by friction. The friction force is due to clamping pressure from wheel anchor rods 20 tightened between the wheel axle plate 24 and the vehicle wheel pulley 15. The wheel anchor rods 20 can be tightened by externally treading the wheel anchor rod first end 18 or wheel anchor rod second end 19 and threading the rod through the multiplicity of wheel axle plate engagement apertures 21 found in the wheel axle plate outer ring 22 and the vehicle wheel pulley attachment ring apertures 14 found in the vehicle wheel pulley attachment ring 13. The preferred method is to have wheel axle plate engagement apertures 21 and the vehicle wheel pulley attachment ring apertures 14 internally threaded to receive the wheel anchor rods 20. These holes can also be large enough to allow the wheel anchor rod 20 threads to pass through and be attached using a nut or other collar. The vehicle wheel pulley 15 has a clearance aperture 16 sized to clear all axle, suspension and braking system parts of the host vehicle and will rotate as freely as the vehicle wheel 33. A commonly known pulley belt 34 is accepted into the vehicle wheel pulley groove 17 and the generator pulley groove 10. The friction on the belt transfers rotation from the vehicle wheel pulley 15 to the generator pulley 11.

The generator side of the generator pulley 9 has an aperture 12 which is preferably welded to the second end generator shaft sleeve 7. The generator shaft sleeve 8 protects the user from the rotating splines on the splined generator shaft 25 and also resists the moment created by the tension of the belt 34 on the generator pulley 11. The first end of the generator shaft sleeve 6 is permanently attached to the crank shaft plate aperture 3 concentric about said aperture. The generator shaft sleeve 8 inner diameter and the crank shaft plate aperture 3 are sized to allow free rotation of the splined generator shaft 25.

The crank shaft plate 1 rotates at a velocity proportional to the rotation of the vehicle wheel 33. This rotation is not transferred to the generator unless there is engagement with the generator shaft gear plate 29. This rotation can be transferred by sliding the gear plate 29 against the crank shaft plate generator side 4. The rotating engagement nodule on the crank shaft plate 5 will interfere with the generator shaft gear plate nodule 31 and cause the entire generator shaft gear plate 29 to rotate.

The generating shaft gear plate has an aperture 28 at its center. The splined generator shaft 25 passes within the generating shaft gear plate aperture 28. The generator shaft gear plate engages the generator shaft by means of splines 30 within the generator shaft gear plate housing 27. The preferred embodiment will have a gearing means within the gear plate housing 27 to increase or decrease relative rotational velocity between the generator shaft gear plate 29 and the generator shaft 25 for the purpose of optimizing power generation.

The generator shaft 25 is connected at its first end 26 to a generator 35. The means for attachment to the generator can be threading the first end or fabricating a bracket to receive to a commonly purchased generator 35. The generator is attached to the car by means of mounting brackets 36, 37. The first mounting bracket 36 and second mounting bracket 37 are fixed to the vehicles frame to prevent movement of the generator 35 under normal operating load. The mounting brackets also have strong springs that allow movement of the generator 35 in response to input forces from the up and down movement of the wheel 33. These mounting brackets 36, 37 will prevent breakage of the generator shaft by allowing the generator to move under impact loads.

Having described the invention what is claimed is:

1. An energy generating system comprising, a generator attached to a vehicle, a shaft attached to said generator, a means for transferring rotational energy from a wheel of said vehicle to the shaft,
   a means for gearing up or down the rotational energy transferred from the tire to the generator,
   wherein the means for transferring rotational energy from the wheel of the vehicle to the shaft is a pulley system,
   wherein the pulley system is attached to a generator shaft sleeve, a generator shaft passes concentrically through the center of the generator shaft sleeve, the generator shaft sleeve is also attached to a crank shaft plate, the crank shaft plate mechanically engages a generator shaft gear plate, the generator shaft gear plate engages the generator shaft, rotating the generator to produce power,
   wherein the pulley system further comprises, a wheel axle plate on the outboard side of the vehicle wheel, a vehicle wheel pulley on the inboard side of said wheel, a wheel anchor rod attached to the wheel axle plate and the vehicle wheel pulley, the wheel anchor rods have a first end and a second end, said first end and second end are attached to a wheel axle plate outer ring and a wheel pulley attachment ring using a means for fastening.

2. An energy generation system comprising, a commonly known vehicle having a vehicle wheel, a wheel axle plate on the outboard side of the vehicle wheel, a vehicle wheel pulley on the inboard side of said wheel, a wheel anchor rod attached to the wheel axle plate and the vehicle wheel pulley, the wheel anchor rods have a first end and a second end, said first end and second end are attached to a wheel axle plate outer ring and a wheel pulley attachment ring using a means for fastening;
   a generator pulley groove in a generator pulley which is capable of receiving a commonly known pulley belt, and transfers rotation from the vehicle wheel pulley to a generator shaft sleeve;
   the generator pulley is attached to a second end generator shaft sleeve, a first end of the generator shaft sleeve is permanently attached to a crank shaft plate; a generator shaft gear plate slidably moves along a generator shaft, an engagement nodule on the crank shaft plate is placed to interfere with a generator shaft gear plate nodule;
   a splined generator shaft passes within a generating shaft gear plate aperture and the generator shaft is engaged by means of splines within a generator shaft gear plate housing, a gearing means within the gear plate housing increases or decreases relative rotational velocity between the generator shaft gear plate and the generator shaft;
   a generator is attached by a means for attaching to a first end of the generator shaft, said generator is attached to the vehicle by means of a first mounting bracket and a second mounting bracket, fixed to the vehicle frame to prevent movement of the generator under normal operating load, said mounting brackets have strong springs that allow movement of the generator in response to input forces from upward and downward movement of the wheel.

* * * * *